United States Patent
Burd

(10) Patent No.: US 12,158,123 B1
(45) Date of Patent: Dec. 3, 2024

(54) SUPPLEMENTAL THRUST SYSTEM WITH ROTATING DETONATION COMBUSTOR

(71) Applicant: Raytheon Technologies Corporation, Farmington, CT (US)

(72) Inventor: Steven W. Burd, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/333,986

(22) Filed: May 28, 2021

(51) Int. Cl.
*F02K 3/00* (2006.01)
*F02C 3/14* (2006.01)
*F02K 3/02* (2006.01)

(52) U.S. Cl.
CPC .............. *F02K 3/02* (2013.01); *F02C 3/14* (2013.01); *F05D 2220/32* (2013.01); *F05D 2240/35* (2013.01)

(58) Field of Classification Search
None
See application file for complete search history.

(56) References Cited

U.S. PATENT DOCUMENTS

| | | | | | |
|---|---|---|---|---|---|
| 2,724,238 | A | * | 11/1955 | Gregg | F02K 1/36 60/761 |
| 2,955,414 | A | * | 10/1960 | Hausmann | F02K 3/12 60/264 |
| 3,598,318 | A | * | 8/1971 | Schiel | F02K 1/625 239/265.29 |
| 3,829,020 | A | * | 8/1974 | Stearns | F02K 1/09 239/265.29 |
| 4,069,661 | A | * | 1/1978 | Rundell | F02K 3/075 60/262 |
| 4,072,008 | A | * | 2/1978 | Kenworth | F02K 3/075 60/262 |
| 4,802,629 | A | * | 2/1989 | Klees | F02K 1/625 239/265.33 |
| 8,082,725 | B2 | | 12/2011 | Younsi | |
| 9,188,002 | B2 | | 11/2015 | Lee | |
| 10,436,110 | B2 | | 10/2019 | Holley | |
| 10,627,111 | B2 | | 4/2020 | Holley | |
| 10,641,169 | B2 | | 5/2020 | Vise | |
| 2009/0016874 | A1 | * | 1/2009 | Corsmeier | F02K 3/077 415/145 |
| 2018/0274787 | A1 | | 9/2018 | Greene | |
| 2018/0274788 | A1 | | 9/2018 | Greene | |
| 2018/0355822 | A1 | * | 12/2018 | Vise | F02K 7/06 |
| 2018/0356093 | A1 | * | 12/2018 | Pal | F23R 7/00 |

(Continued)

FOREIGN PATENT DOCUMENTS

CN 104153884 B 10/2015

OTHER PUBLICATIONS

Wikipedia, Ramjet, 2015 (Year: 2015).*

*Primary Examiner* — Edwin Kang
(74) *Attorney, Agent, or Firm* — Getz Balich LLC

(57) ABSTRACT

An assembly is provided for a turbine engine. This turbine engine assembly includes a supplemental thrust section and a duct. The supplemental thrust section includes a rotating detonation combustor. The duct includes a supplemental thrust section inlet fluidly coupled with and leading to the rotating detonation combustor. The supplemental thrust section inlet has a flow area that decreases as at least a first portion of the supplemental thrust section inlet extends towards the rotating detonation combustor.

7 Claims, 14 Drawing Sheets

(56) References Cited

U.S. PATENT DOCUMENTS

| | | | |
|---|---|---|---|
| 2018/0356096 A1* | 12/2018 | Pal | F23R 3/36 |
| 2019/0063372 A1* | 2/2019 | Robinson | F02K 9/97 |
| 2019/0271268 A1 | 9/2019 | Johnson | |
| 2020/0025133 A1* | 1/2020 | Watson | F02K 1/06 |
| 2020/0386189 A1* | 12/2020 | Powell | F02K 3/11 |
| 2021/0108801 A1* | 4/2021 | Singh | F23R 3/002 |

* cited by examiner

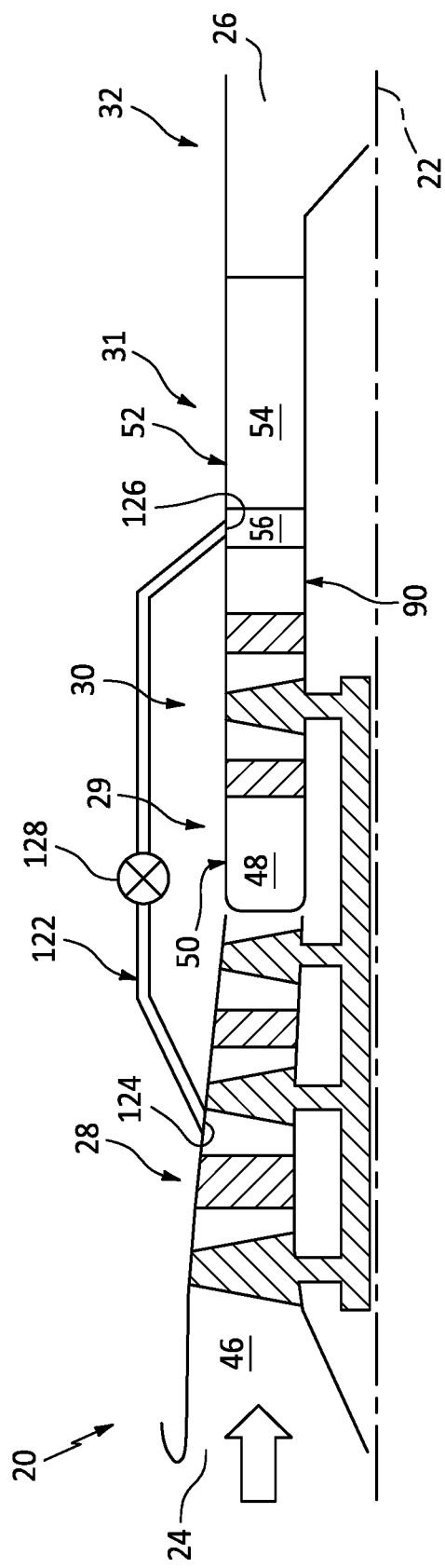
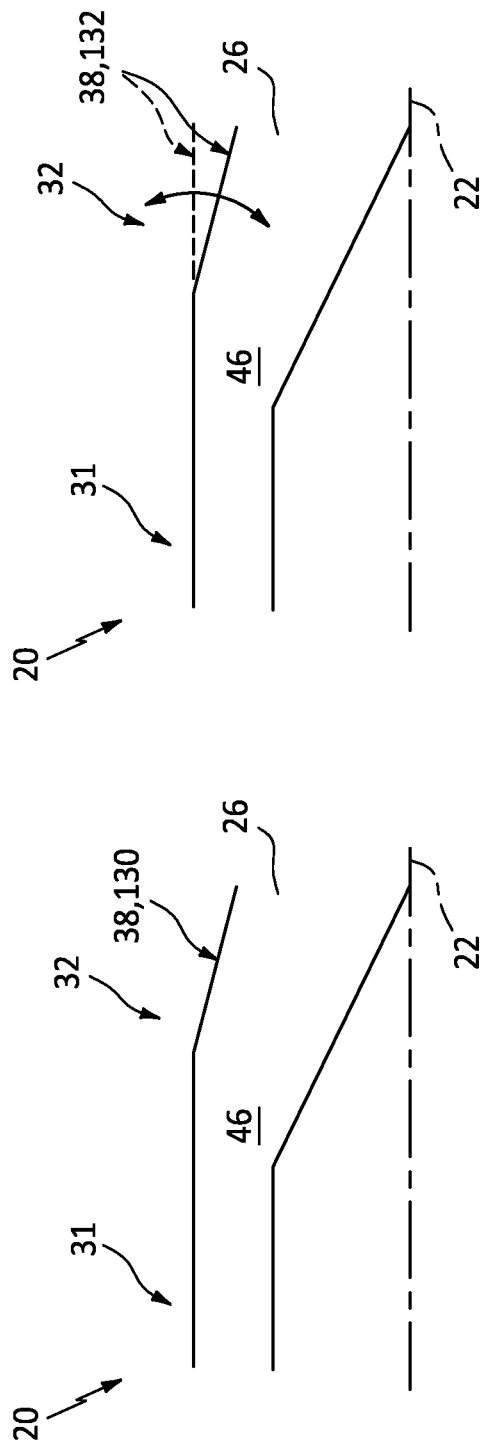
FIG. 15
FIG. 16B
FIG. 16A

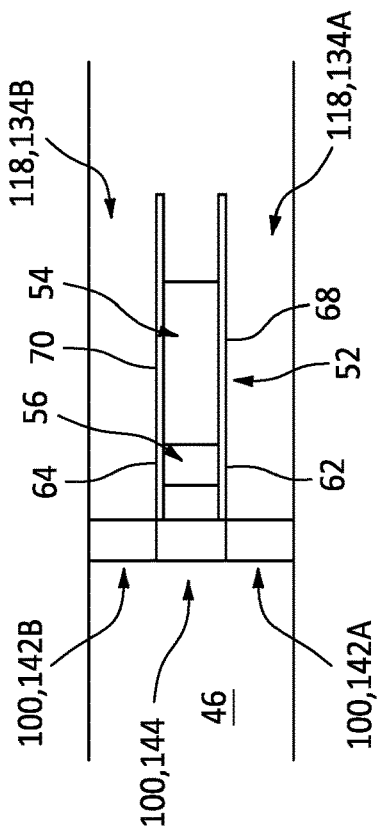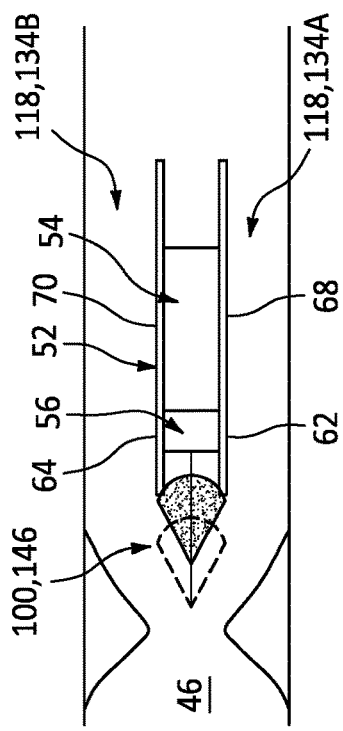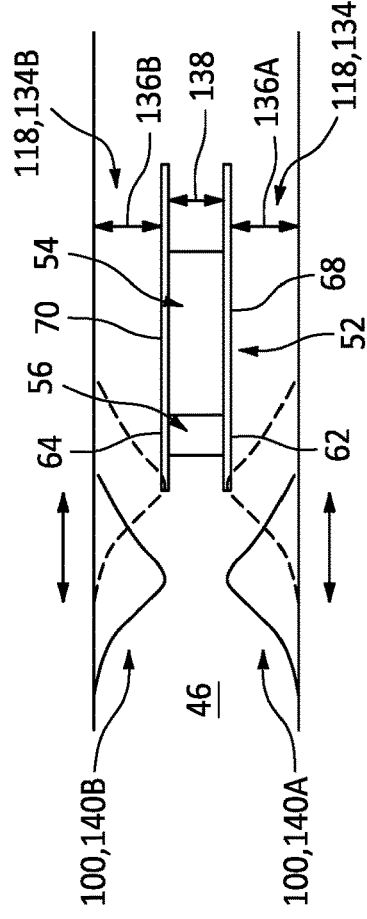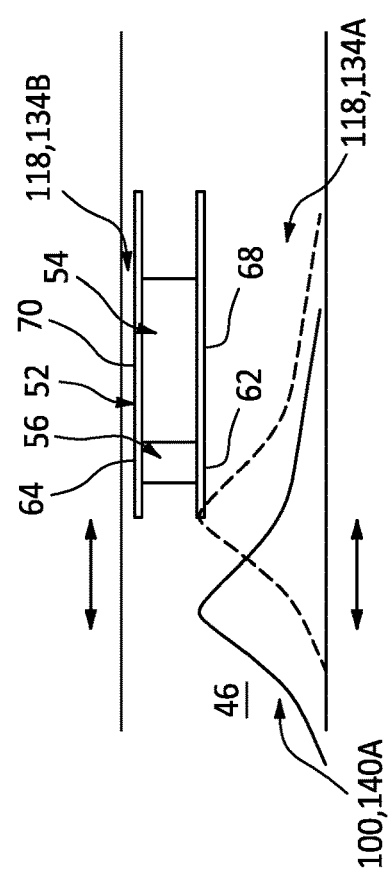

SUPPLEMENTAL THRUST SYSTEM WITH ROTATING DETONATION COMBUSTOR

BACKGROUND OF THE DISCLOSURE

1. Technical Field

This disclosure relates generally to a turbine engine and, more particularly, to a supplemental thrust system for the turbine engine.

2. Background Information

Various types and configurations of gas turbine engines are known in the art for propelling aircraft. These known turbine engines may be configured with relatively large aircraft as well as with relatively small aircraft. Typically, turbine engines configured with small aircraft have relatively low thrust ratings. Such small aircraft therefore may have difficultly reaching and/or maintaining high Mach flight; e.g., supersonic flight. While it is known to provide some large turbine engines with a supplemental thrust system, these known supplemental thrust systems are relatively bulky and may be difficult to implement with small/compact gas turbine engines. There is a need in the art therefore for a supplemental thrust system for gas turbine engines, particularly relatively small/compact gas turbine engines.

SUMMARY OF THE DISCLOSURE

According to an aspect of the present disclosure, an assembly is provided for a turbine engine. This turbine engine assembly includes a supplemental thrust section and a duct. The supplemental thrust section includes a rotating detonation combustor. The duct includes a supplemental thrust section inlet fluidly coupled with and leading to the rotating detonation combustor. The supplemental thrust section inlet has a flow area that decreases as at least a first portion of the supplemental thrust section inlet extends towards the rotating detonation combustor.

According to another aspect of the present disclosure, another assembly is provided for a turbine engine. This turbine engine assembly includes a supplemental thrust section, a duct and a bypass passage. The supplemental thrust section includes a rotating detonation combustor. The duct is configured to direct gas into the supplemental thrust section during a first mode. The bypass passage is configured, during a second mode, to: receive at least a portion of the gas form the duct; and direct the portion of the gas to bypass the supplemental thrust section.

According to still another aspect of the present disclosure, another assembly is provided for a turbine engine. This turbine engine assembly includes a compressor section, a combustor section, a turbine section and a supplemental thrust section arranged sequentially along a flowpath between an engine inlet and an engine exhaust. The supplemental thrust section includes a rotating detonation combustor. The turbine engine assembly also includes a bypass passage. The bypass passage is configured to: receive gas from the flowpath upstream of the combustor section; and provide the gas to the supplemental thrust section during at least a mode of operation of the rotating detonation combustor.

The bypass passage may direct the gas into a combustion chamber of the rotating detonation combustor.

The supplemental thrust section may be operational during the first mode. The supplemental thrust section may be non-operational during the second mode.

The supplemental thrust section may be operational during the first mode and the second mode.

The turbine engine assembly may also include an exhaust nozzle fluidly coupled with and downstream of the supplemental thrust section and the bypass passage.

The turbine engine assembly may also include a turbine section upstream of the supplemental thrust section. The supplemental thrust section inlet may fluidly couple the turbine section to the rotating detonation combustor.

The supplemental thrust section inlet may be configured as or otherwise include an annular supplemental thrust section inlet.

The supplemental thrust section inlet may include an inner wall and an outer wall. The inner wall may extend circumferentially about a centerline. The inner wall may extend radially outward towards the outer wall as the first portion of the supplemental thrust section inlet extends axially along the centerline towards the rotating detonation combustor.

The supplemental thrust section inlet may include an inner wall and an outer wall. The outer wall may extend circumferentially about a centerline. The outer wall may extend radially inward towards the inner wall as the first portion of the supplemental thrust section inlet extends axially along the centerline towards the rotating detonation combustor.

The flow area may increase as a second portion of the supplemental thrust section inlet extends away from the first portion of the supplemental thrust section inlet and towards the rotating detonation combustor.

The supplemental thrust section inlet may form a convergent-divergent diffuser inlet to the supplemental thrust section.

The turbine engine assembly may also include a variable area exhaust nozzle fluidly coupled with and configured downstream of the supplemental thrust section.

The turbine engine assembly may also include a turbine section, a combustor section and a bypass passage. The turbine section may be fluidly coupled with and upstream of the duct. The combustor section may be fluidly coupled with and upstream of the turbine section. The bypass passage may be configured to provide gas to the supplemental thrust section that bypasses the combustor section and the turbine section.

The turbine engine assembly may also include a compressor section fluidly coupled with and upstream of the combustor section. The bypass passage may be configured to receive the gas from the compressor section.

The turbine engine assembly may also include a turbine section and a flow regulator. The turbine section may be fluidly coupled with and upstream of the duct. The flow regulator may be configured to regulate a flow of gas exhausted from the turbine section into the supplemental thrust section.

The flow regulator may be configured as or otherwise include a variable area diffuser.

The flow regulator may be configured as or otherwise include a moveable sleeve.

The flow regulator may be configured as or otherwise include an array of variable stator vanes.

The flow regulator may be configured as or otherwise include a translating plug.

The turbine engine assembly may also include a bypass passage configured to direct at least a portion of gas flowing within the duct to bypass the supplemental thrust section. The flow regulator may be configured as or otherwise include a valve configured with the bypass passage.

The turbine engine assembly may also include a bypass passage configured to direct at least a portion of gas flowing within the duct around the supplemental thrust section.

The bypass passage may be configured as or otherwise include an annular inner duct arranged inward of and extending longitudinally along the rotating detonation combustor. The bypass passage may also or alternatively be configured as or otherwise include an annular outer duct arranged outward of and extending longitudinally along the rotating detonation combustor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 15 is a sectional illustration of a portion of the turbine engine with a combustor and turbine bypass.

FIGS. 16A and 16B are sectional illustrations of portions of the turbine engine with various different exhaust nozzles.

FIGS. 18A-18D are partial schematic illustrations of various alternative ducts arrangements for bypassing at least the rotating detonation combustor.

DETAILED DESCRIPTION

Figure 1:
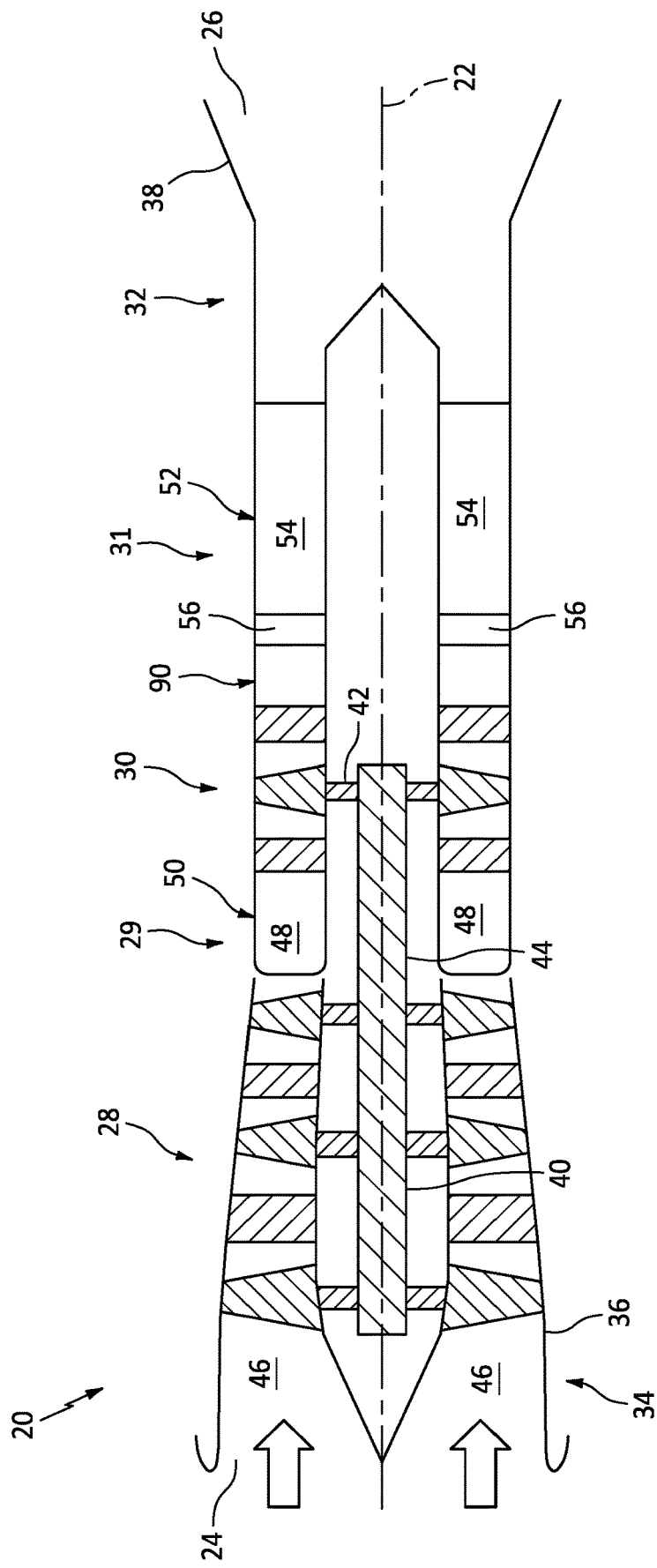
FIG. 1 is a sectional schematic illustration of a gas turbine engine.

FIG. 1 is a schematic illustration of a gas turbine engine 20; e.g., a turbojet engine. This turbine engine 20 extends along an axial centerline 22 (e.g., a rotational axis) between an upstream airflow inlet 24 (e.g., an engine inlet) and a downstream exhaust outlet 26 (e.g., an engine exhaust). The turbine engine includes a compressor section 28, a combustor section 29, a turbine section 30, a supplemental thrust section 31 with a supplemental thrust system, and an exhaust section 32.

The engine sections 28-32 are arranged sequentially along the axial centerline 22 within an engine housing 34. This engine housing 34 includes an engine case 36 that houses one or more of the engine sections 28-32. The engine case 36 of FIG. 1, for example, extends axially along the axial centerline 22 from the airflow inlet 24 to an exhaust nozzle 38 at the exhaust outlet 26.

Each of the engine sections 28 and 30 includes a respective rotor 40 and 42. Each of these rotors 40 and 42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 40 is connected to the turbine rotor 42 through an engine shaft 44. This engine shaft 44 is rotatably supported by a plurality of bearings (not shown), which bearings are connected to the engine housing 34 by at least one stationary structure such as, for example, an annular support strut (not shown).

During operation, air enters the turbine engine 20 through the airflow inlet 24. This air is directed into at least a core flowpath 46. This core flowpath 46 extends sequentially through the engine sections 28-32 to the exhaust outlet 26. The air within the core flowpath 46 may be referred to as core air.

The core air is compressed by the compressor rotor 40 and directed into a combustion chamber 48 of a combustor 50 in the combustor section 29. Fuel is injected into the combustion chamber 48 and mixed with the compressed core air to provide a fuel-air mixture. This fuel-air mixture is ignited and combustion products thereof flow through and cause the turbine rotor 42 to rotate. The rotation of the turbine rotor 42 drives rotation of the compressor rotor 40 and, thus, compression of the air received from the airflow inlet 24. The combustion products are directed out of the turbine engine 20 through the exhaust nozzle 38 to provide forward engine thrust.

The turbine engine 20 may be configured to operate in various different modes of operation such as, but not limited to, low thrust operation and high thrust operation. The turbine engine 20 may be operated in low thrust operation where, for example, additional/supplemental forward engine thrust provided by the supplemental thrust section 31 is not required. Examples of low thrust operation include, but are not limited to, aircraft takeoff, low speed aircraft cruise, subsonic aircraft flight and/or aircraft landing. On the other hand, the turbine engine 20 may be operated in high thrust operation where, for example, additional/supplemental forward engine thrust provided by the supplemental thrust section 31 is required or otherwise beneficial to aircraft flight. Examples of high thrust operation include, but are not limited to, high speed aircraft cruise, supersonic aircraft flight and/or high speed aircraft maneuvers.

When the supplemental thrust section 31 is non-operation, gas (e.g., the combustion products) exhausted from the turbine section 30 may flow through the supplemental thrust section 31 substantially uninterrupted (e.g., without introduction of additional fuel, without additional combustion, etc.) to the exhaust nozzle 38. Thus, the supplemental thrust section 31 does not provide any forward engine thrust to supplement the forward engine thrust already provided by the exhaust gas. On the other hand, when the supplemental thrust section 31 is operational, additional fuel is mixed with the exhaust gas within the supplemental thrust section 31. This fuel-gas mixture is ignited and combustion products thereof flow out of the supplemental thrust section 31, through the exhaust section 32, to the exhaust nozzle 38. Thrust provided by the additional combustion products supplement the thrust already provided by the combustion products exhausted from the turbine section 30 and, thus, provide the turbine engine 20 with additional forward engine thrust. The level of the additional forward engine thrust is related to a quantity of additional fuel mixed with the exhaust gas and ignited within the supplemental thrust section 31. The fuel may be injected into the supplemental thrust section 31 at a steady, uniform flow rate, or may be varied to control the level of the additional forward engine thrust.

The supplemental thrust section 31 of FIG. 1 includes a rotating detonation combustor 52, which may also be referred to as a rotating detonation engine. This rotating detonation combustor 52 may have a relatively radially and/or axially compact form.

The rotating detonation combustor 52 is configured to inject the additional fuel into the core flowpath 46 for mixing with the gas exhausted from the turbine section 30. This fuel-gas mixture is ignited within the rotating detonation combustor 52 to generate detonation waves, where each of the detonation waves travels circumferentially around and axially through a rotating detonation combustor (RDC) combustion annulus 54 of the rotating detonation combustor 52. By contrast, combustion products within a traditional combustor/supplemental thrust system flow substantially axially therethrough.

Figure 2:
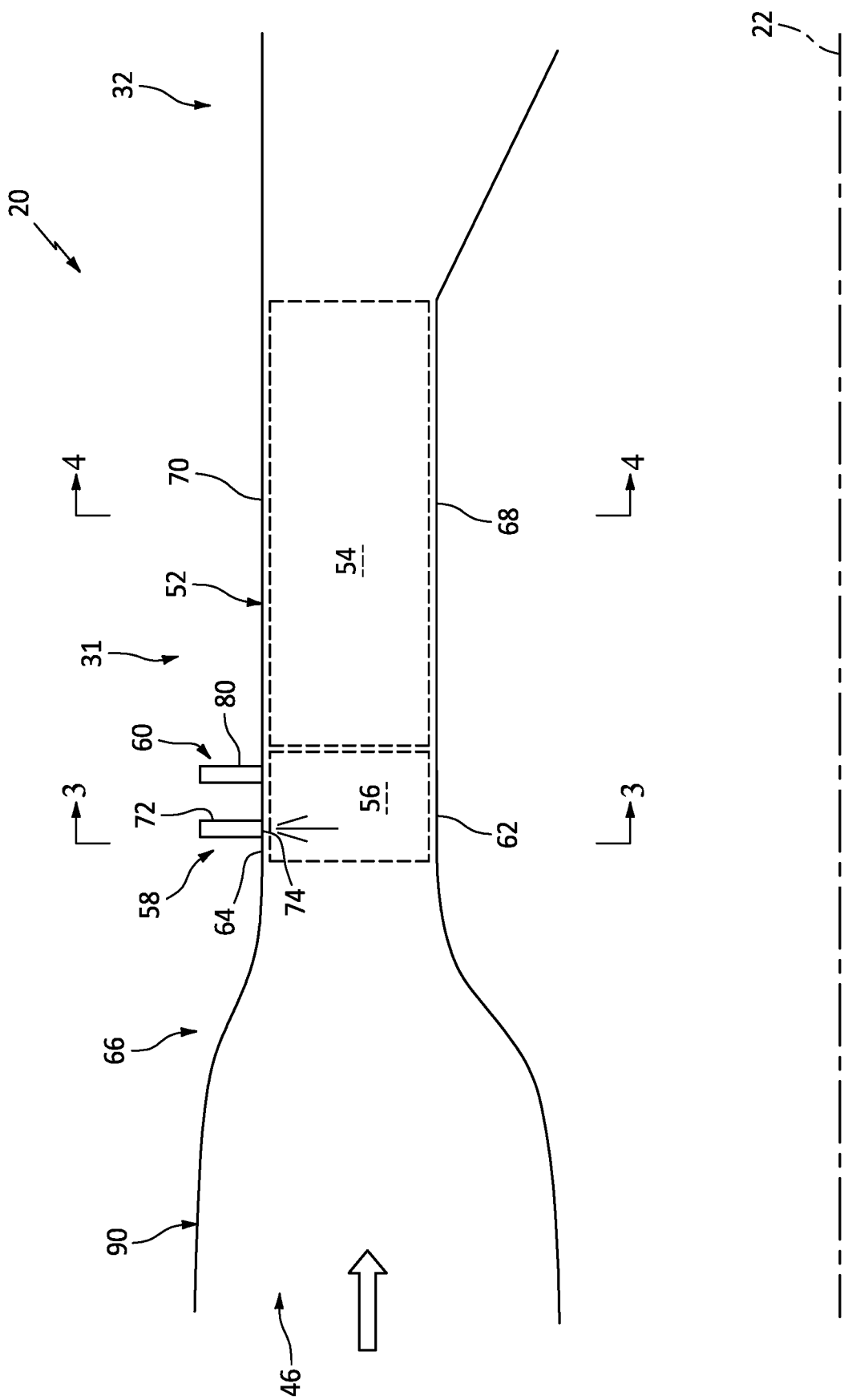
FIG. 2 is a sectional schematic illustration of a portion of the turbine engine with a supplemental thrust section.

Referring to FIG. 2, the rotating detonation combustor 52 is configured with one or more internal volumes. The rotating detonation combustor 52 of FIG. 2, for example, includes a rotating detonation combustor (RDC) combustion chamber 56 and the combustion annulus 54. The rotating detonation combustor 52 also includes a fuel injection system 58 and an igniter system 60.

Figure 3:
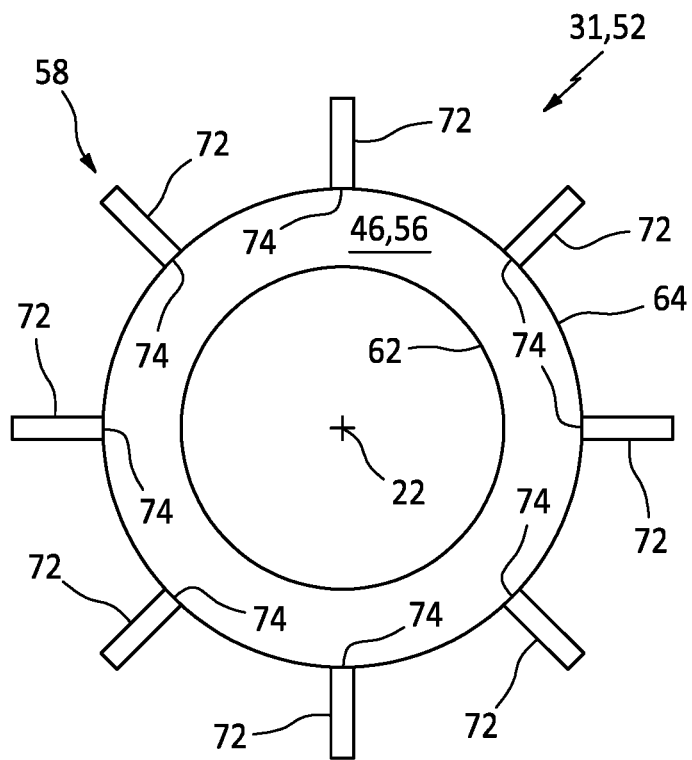
FIG. 3 is a cross-sectional schematic illustration of a combustion chamber for the supplemental thrust section taken along line 3-3 in FIG. 2.

The combustion chamber 56 of FIGS. 2 and 3 is configured as a tubular chamber. Referring to FIG. 2, this combustion chamber 56 extends radially between and is formed by a radial inner wall 62 and a radial outer wall 64. Each of these chamber walls 62 and 64 extends circumferentially about (e.g., completely around) the axial centerline 22. Each of the chamber walls 62 and 64 extends axially along the axial centerline 22 from (or about) a supplement thrust section (STS) inlet 66 to (or about) an upstream end of the combustion annulus 54. The combustion chamber 56 of FIG. 2 is configured with a uniform cross-sectional flow area along its longitudinal length; e.g., along the axial centerline 22. However, in other embodiments, the cross-sectional flow area of the combustion chamber 56 may be non-uniform; e.g., converging and/or diverging as the chamber 56 extends axially downstream.

Figure 4:
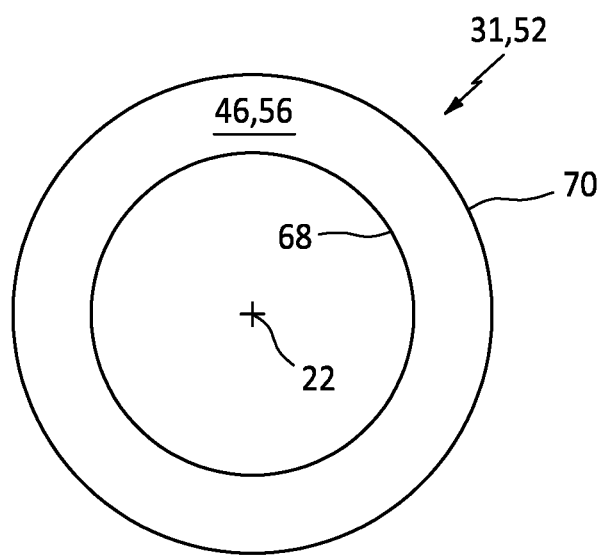
FIG. 4 is a cross-sectional schematic illustration of a combustion annulus for the supplemental thrust section taken along line 4-4 in FIG. 2.

The combustion annulus 54 of FIGS. 2 and 4 is configured as a tubular chamber. Referring to FIG. 2, this combustion annulus 54 extends radially between and is formed by a radial inner wall 68 and a radial outer wall 70. Each of these annulus walls 68 and 70 extends circumferentially about (e.g., completely around) the axial centerline 22. Each of the annulus walls 68 and 70 extends axially along the axial centerline 22 from (or about) a downstream end of the combustion chamber 56 to (or about) an upstream end of the exhaust section 32. The combustion annulus 54 of FIG. 2 is configured with a uniform cross-sectional flow area along its longitudinal length; e.g., along the axial centerline 22. However, in other embodiments, the cross-sectional flow area of the combustion annulus 54 may be non-uniform; e.g., converging and/or diverging as the annulus 54 extends axially downstream.

The annulus inner wall 68 may be radially aligned with, connected to and/or formed integral with the chamber inner wall 62. However, in other embodiments, the inner walls 62 and 68 may be discrete and/or separated from one another by another section of wall, a flow impediment, a radial jog, etc. The annulus outer wall 70 may be radially aligned with, connected to and/or formed integral with the chamber outer wall 64. However, in other embodiments, the outer walls 64 and 70 may be discrete and/or separated from one another by another section of wall, a flow impediment, a radial jog, etc.

Figure 5:
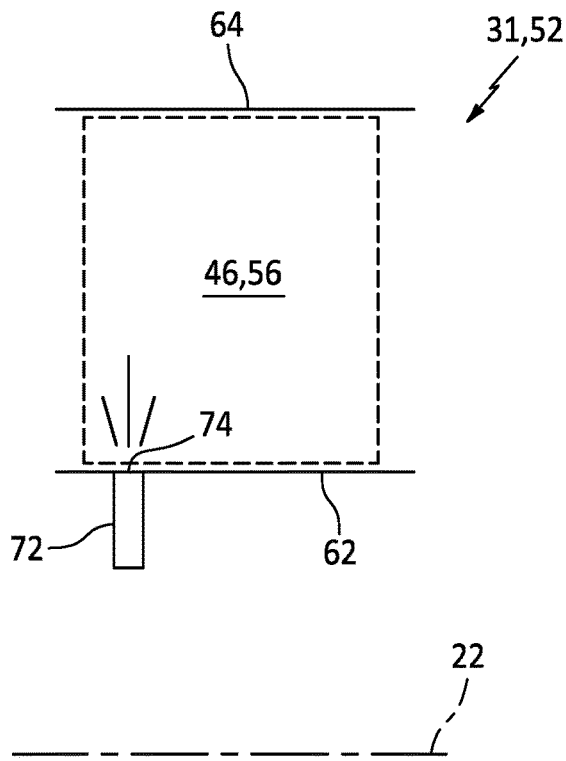
FIG. 5 is a sectional illustration of a portion of the supplemental thrust section with an inner wall fuel injector.
Figure 6:
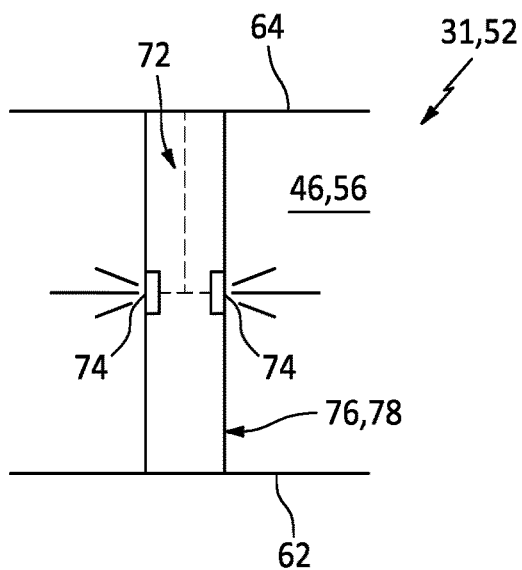
FIG. 6 is a cross-sectional illustration of a portion of the supplemental thrust section with a vane fuel injector.
Figure 7:
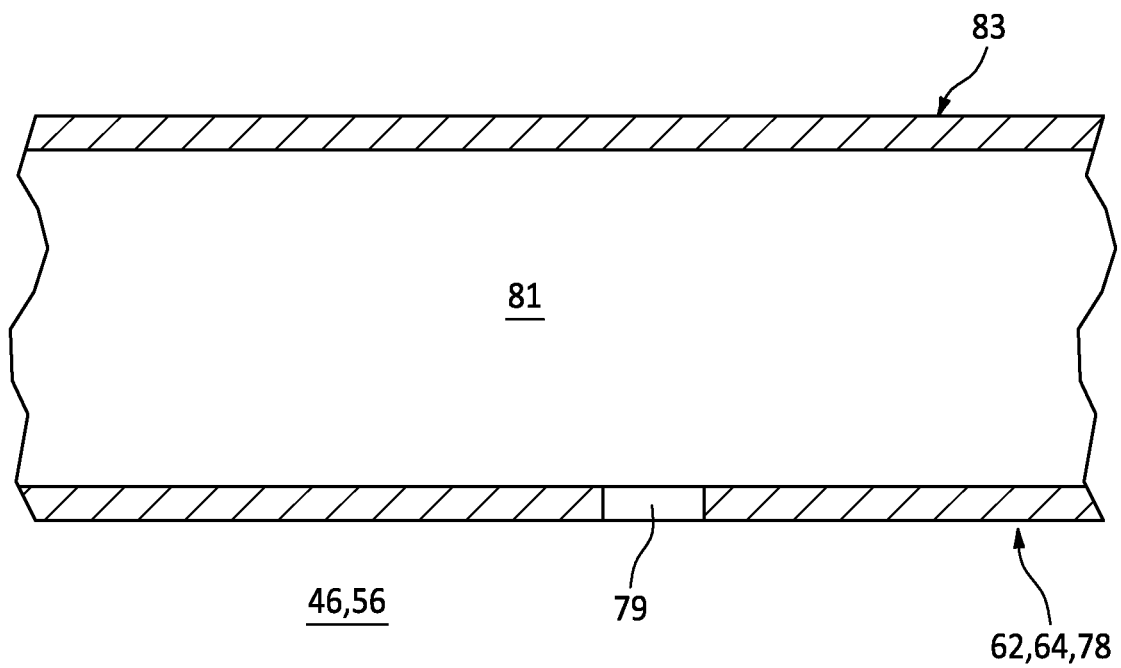
FIG. 7 is a sectional illustration of a portion of the supplemental thrust section with a fuel injection orifice.

The fuel injection system 58 is configured to inject fuel into the combustion chamber 56. The fuel injection system 58 of FIGS. 2 and 3, for example, includes one or more fuel injectors 72. The fuel injectors 72 of FIG. 3 are arranged circumferentially about the axial centerline 22 in an annular array. Each fuel injector 72 is configured to spray (e.g., an atomized spray) of the fuel into the combustion chamber 56. Each fuel injector 72 of FIG. 2, for example, is configured with a nozzle orifice 74 through the chamber outer wall 64, where that fuel injector 72 is operable to inject the fuel radially inward through the respective nozzle orifice 74 into the combustion chamber 56. The present disclosure, however, is not limited to such an exemplary fuel injector configuration. For example, referring to FIG. 5, each of the fuel injectors 72 may alternatively be configured with its nozzle orifice 74 through the chamber inner wall 62, where that fuel injector 72 is operable to inject the fuel radially outward through the respective nozzle orifice 74 into the combustion chamber 56. In another example, referring to FIG. 6, each of the fuel injectors 72 may alternatively be configured with a vane array 76 within the core flowpath 46. This vane array 76 may include one or more vanes 78 arranged circumferentially about the axial centerline 22 in an annular array (one vane 78 visible in FIG. 6), where each vane 78 extends radially across the core flowpath 46/the combustion chamber 56. Each fuel injector 72 is arranged with a respective one of the vanes 78, and is operable to inject the fuel laterally (e.g., circumferentially or tangentially) out of one or more respective nozzle orifices 74 into the combustion chamber 56. Of course, the fuel injection system 58 may alternatively include any combination of the fuel injectors 72 shown in FIGS. 2, 5 and/or 6, and/or various other types of fuel injectors 72 capable of delivering the fuel to the combustion chamber 56. Furthermore, while the fuel injection system 58 is described as including fuel injectors 72 above, one or more of these fuel injectors 72 may be replaced with an orifice 79 in the respective component (e.g., 64, 62 or 78 as shown, for example, in FIG. 7. This orifice 79 of FIG. 7 fluidly coupled with an adjacent fuel passage 81 of, for example, a fuel manifold 83.

Referring to FIG. 2, the igniter system 60 includes one or more igniters 80; e.g., fuel detonators. These igniters 80 may be arranged circumferentially about the axial centerline 22 in a similar manner as described above with respect to the fuel injectors 72. Each of the igniters 80 is arranged downstream of the fuel injectors 72. Each of the igniters 80 is configured to ignite a mixture of the fuel and the exhaust gas.

Figure 8:
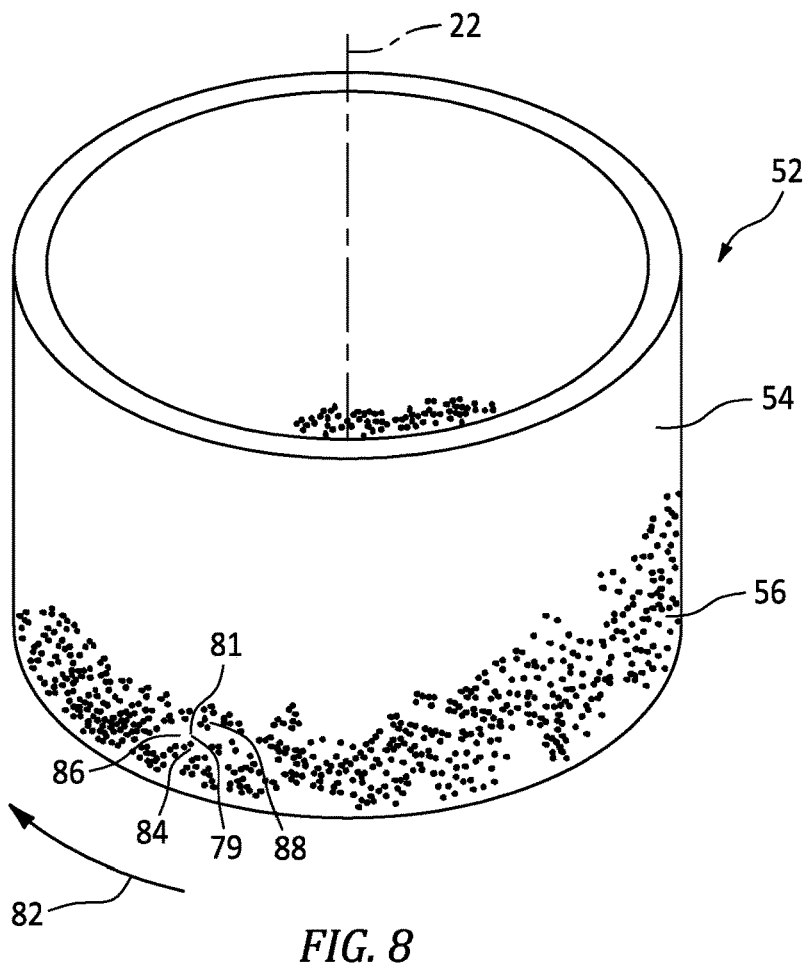
FIGS. 8 and 9 are schematic illustrations of the supplemental thrust section during operation.
Figure 9:
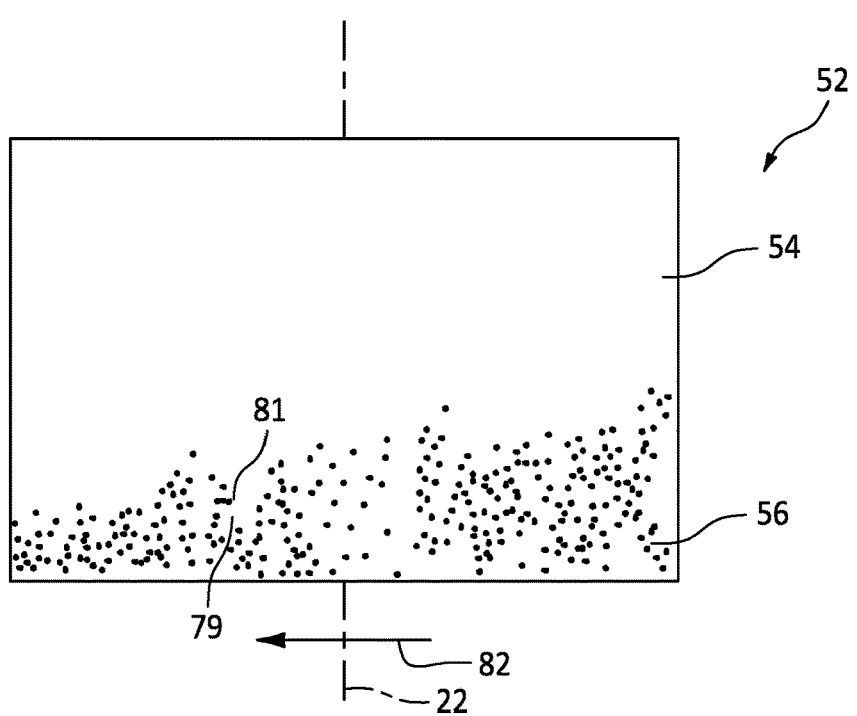

During operation of the supplemental thrust section 31 of FIG. 2, the STS inlet 66 directs the gas exhausted from the turbine section 30 (see FIG. 1) into the combustion chamber 56. The fuel injection system 58 inject the fuel into the combustion chamber 56 for mixing with the exhaust gas. This fuel-gas mixture is ignited by the igniter system 60, which initiates detonation of the fuel-gas mixture. Referring to FIGS. 8 and 9, the detonation may correspond to an ignition or combustion of the fuel-gas mixture at a particular location about a circumference of the combustion annulus 54.

The detonation may continuously travel around a circumference of the combustion annulus 54. For example, a detonation 79 may initially occur at a starting location 81 and may then propagate/travel in a circumferential direction 82. A first location 84 within the rotating detonation combustor 52, preceding the detonation 79, may include a relatively large density of the fuel-gas mixture 86. As the detonation 79 reaches this first location 84, the density of the fuel-gas mixture 86 facilitates detonation thereof. Following this detonation 79, the fuel-gas mixture 86 may be burned away and a force of the detonation 79 may temporarily resist entry of additional fuel-gas mixture into the rotating detonation combustor 52. Thus, a second location 88 that has recently detonated may have a relatively low density of the fuel-gas mixture 86. The detonation 79 may thereby continue to rotate about the axial centerline 22 through the rotating detonation combustor 52 in the circumferential direction 82. One skilled in the art, of course, will recognize there may be certain variations in the foregoing detonation dynamics.

To facilitate rotating detonation combustor operation within the supplemental thrust section 31, the turbine engine 20 of the present disclosure is configured to condition the exhaust gas output from the turbine section 30. In particular, referring to FIG. 1, the gas exhausted by the turbine section 30 and directed through the core flowpath 46 via an inter-turbine-supplemental thrust section duct 90 towards the supplemental thrust section 31 may be relatively turbulent, high temperature, high speed and oxygen deficient. The exhaust gas received by the supplemental thrust section 31 may thereby be relatively vitiated, particularly compared to the relatively low temperature, low speed and oxygen rich core air received by the combustor in the combustor section 29. To accommodate arrangement of the rotating detonation combustor 52 downstream of the turbine section 30, the exhaust gas provided to the rotating detonation combustor 52 via the duct 90 may be conditioned using one or more techniques such as, but not limited to:

(1) Accelerating the exhaust gas provided to the rotating detonation combustor 52;
(2) Decelerating the exhaust gas provided to the rotating detonation combustor 52;
(3) Diffusing the exhaust gas provided to the rotating detonation combustor 52;
(4) Providing supplemental oxygen-rich gas to the rotating detonation combustor 52; and/or
(5) Regulating gas flow to and/or through the rotating detonation combustor 52. The rotating detonation combustor 52 may thereby be subject to flow conditions closer to that experienced by a combustor in a typical inter-compressor-turbine location; e.g., the combustor 50 of FIG. 1.

Figure 10:
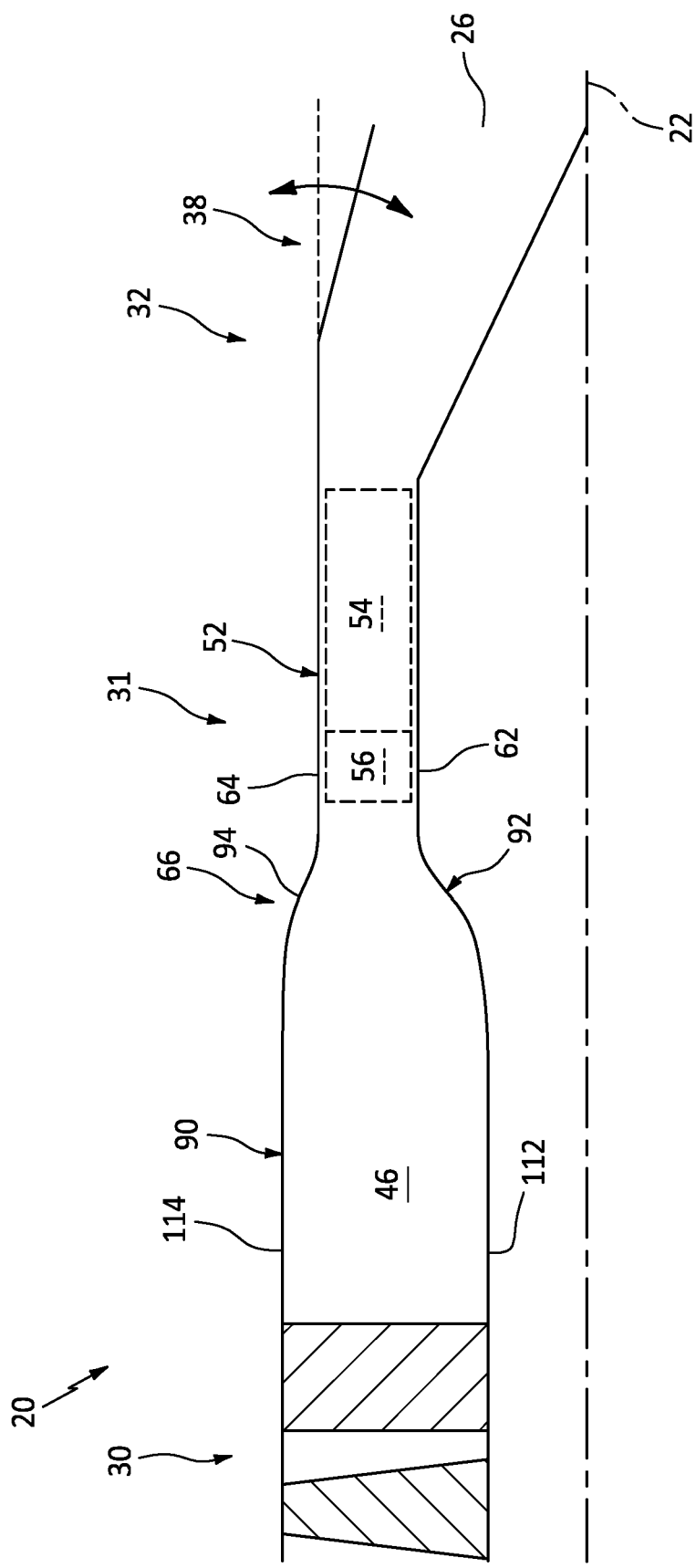
FIG. 10 is a sectional schematic illustration of a portion of the turbine engine with the supplemental thrust section and a convergent inlet.

Referring to FIG. 10, the STS inlet 66 may be configured to accelerate the gas exhausted from the turbine section 30 towards/into the combustion chamber 56. The STS inlet 66 of FIG. 10, for example, is configured as a convergent inlet nozzle, which inlet nozzle is axially between and fluidly couples the turbine section 30 and the combustion chamber 56. The STS inlet 66 may be configured as a part of the duct 90 and/or the supplemental thrust section 31.

The STS inlet 66 of FIG. 10 includes a radial inner wall 92 and a radial outer wall 94. The inlet inner wall 92 extends circumferentially about (e.g., completely around) the axial centerline 22. At least a portion (or an entirety) of the inlet inner wall 92 extends radially outward towards the inlet outer wall 94 as the STS inlet 66 extends axially downstream towards (or to) the combustion chamber 56 and its inner wall 62. The inlet inner wall 92 of FIG. 10 may thereby be canted relative to the axial centerline 22, and converge radially outwards towards the inlet outer wall 94. Similarly, the inlet outer wall 94 extends circumferentially about (e.g., completely around) the axial centerline 22. The inlet outer wall 94 extends radially inward towards the inlet inner wall 92 as the STS inlet 66 extends axially downstream towards (or to) the combustion chamber 56 and its outer wall 64. The inlet outer wall 94 of FIG. 10 may thereby be canted relative to the axial centerline 22, and converge radially inwards towards the inlet inner wall 92. With this configuration, a cross-sectional flow area of the core flowpath 46 (e.g., when viewed in a plane perpendicular to the axial centerline 22) may continuously (or intermittently) decrease as the STS inlet 66 extends downstream axially along the axial centerline 22 towards (or to) the combustion chamber 56. Of course, in other embodiments, the inlet inner wall 92 may converge radially outwards toward the inlet outer wall 94 and the inlet outer wall 94 may maintain a substantially constant radius, or vice versa.

Figure 11:
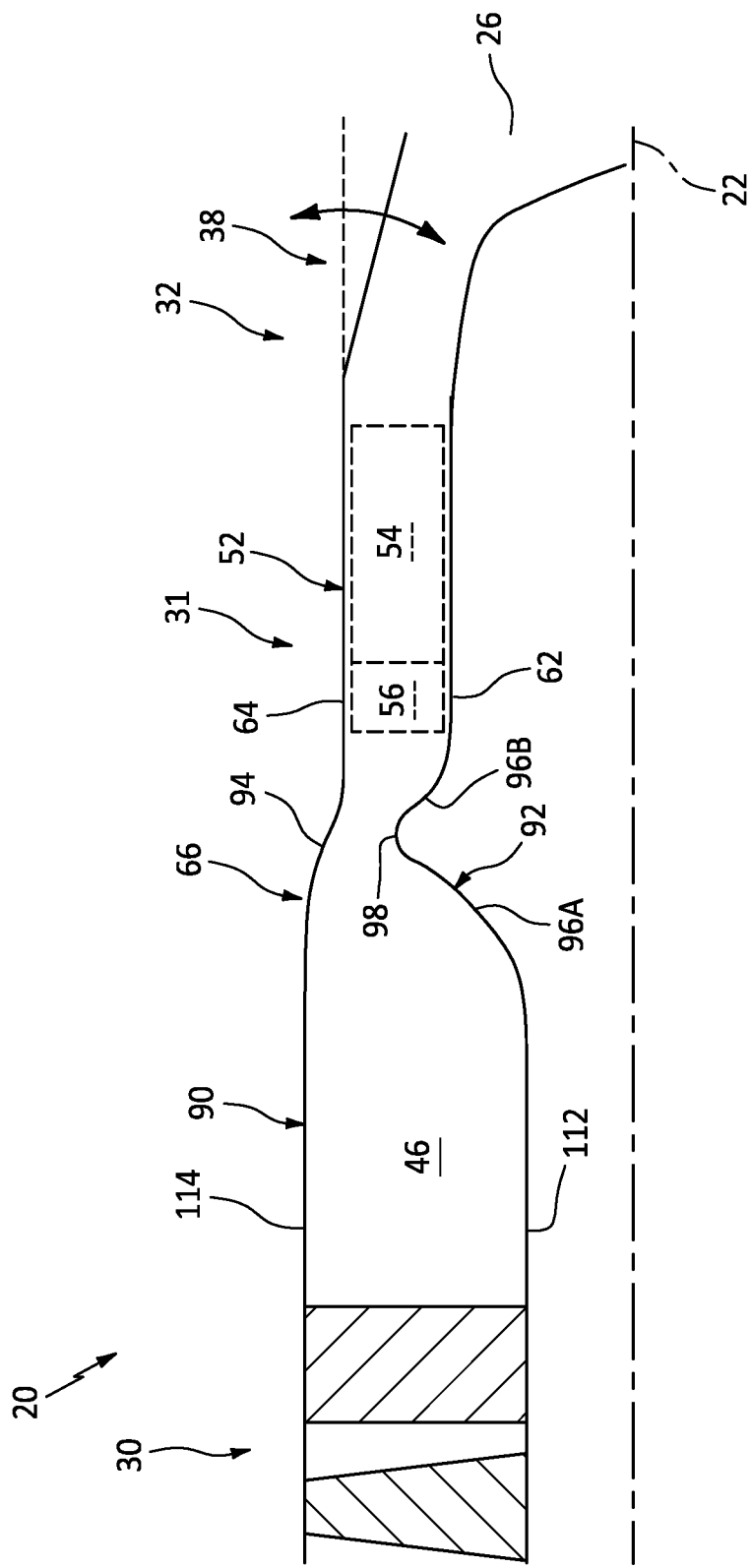
FIG. 11 is a sectional schematic illustration of a portion of the turbine engine with the supplemental thrust section and a convergent-divergent inlet.

Referring to FIG. 11, the STS inlet 66 may be configured to diffuse and decelerate the exhaust gas directed towards/into the combustion chamber 56. The STS inlet 66 may thereby increase a static pressure of the exhaust gas provided to the rotating detonation combustor 52. The STS inlet 66 of FIG. 11, for example, is configured as a convergent-divergent inlet nozzle (e.g., diffuser inlet), which inlet nozzle is axially between and fluidly couples the turbine section 30 and the combustion chamber 56.

The STS inlet 66 of FIG. 11 includes the radial inner wall 92 and the radial outer wall 94. The inlet inner wall 92 extends circumferentially about (e.g., completely around) the axial centerline 22. An upstream portion 96A of the inlet inner wall 92 extends radially outward towards the inlet outer wall 94 as the STS inlet 66 extends axially downstream, towards the combustion chamber 56, to an inner wall peak 98. The inlet inner wall upstream portion 96A of FIG. 11 may thereby be canted relative to the axial centerline 22, and converge radially outward towards the inlet outer wall 94. A downstream portion 96B of the inlet inner wall 92 extends radially inwards away from the inlet outer wall 94 as the STS inlet 66 extends axially downstream away from the inner wall peak 98 and towards (or to) the combustion chamber 56 and its inner wall 62. The inlet inner wall downstream portion 96B of FIG. 11 may thereby be canted relative to the axial centerline 22, and diverge radially inward away from the inlet outer wall 94. The inlet outer wall 94 extends circumferentially about (e.g., completely around) the axial centerline 22. The inlet outer wall 94 extends radially inward towards the inlet inner wall 92 as the STS inlet 66 extends axially downstream towards (or to) the combustion chamber 56 and its outer wall 64. The inlet outer wall 94 of FIG. 10 may thereby be canted relative to the axial centerline 22, and converge radially inwards towards the inlet inner wall 92. With this configuration, a cross-sectional flow area of the core flowpath 46 (e.g., when viewed in a plane perpendicular to the axial centerline 22) may continuously (or intermittently) decrease as the STS inlet 66 extends downstream axially along the axial centerline 22 to the inner wall peak 98. The cross-sectional flow area of the core flowpath 46 may continuously (or intermittently) increase as the STS inlet 66 extends downstream axially along the axial centerline 22 away from the inner wall peak 98 and towards (or to) the combustion chamber 56. Of course, in other embodiments, the inlet inner wall 92 may converge and then diverge and the inlet outer wall 94 may maintain a substantially constant radius, or otherwise.

Referring to FIGS. 12, 13, 14A and 14B, the turbine engine 20 may be configured with a flow regulator 100. This flow regulator 100 may be configured to regulate flow of the exhaust gas into the supplemental thrust section 31 and its combustion chamber 56. Various embodiments of the flow regulator 100 are described below with respect to FIGS. 12, 13, 14A and 14B. While these embodiments are described separately, any two or more of these embodiments may be combined together to provide further flow control. By way of example, the embodiment of FIG. 12 or 13 may be paired with the embodiment of FIG. 14A or 14B. In another example, the embodiment of FIG. 12 may be paired with the embodiment of FIG. 13 and the embodiment of FIG. 14A or 14B. The flow regulator 100 of the present disclosure, however, is not limited to the exemplary flow configurations described herein.

Figure 12:
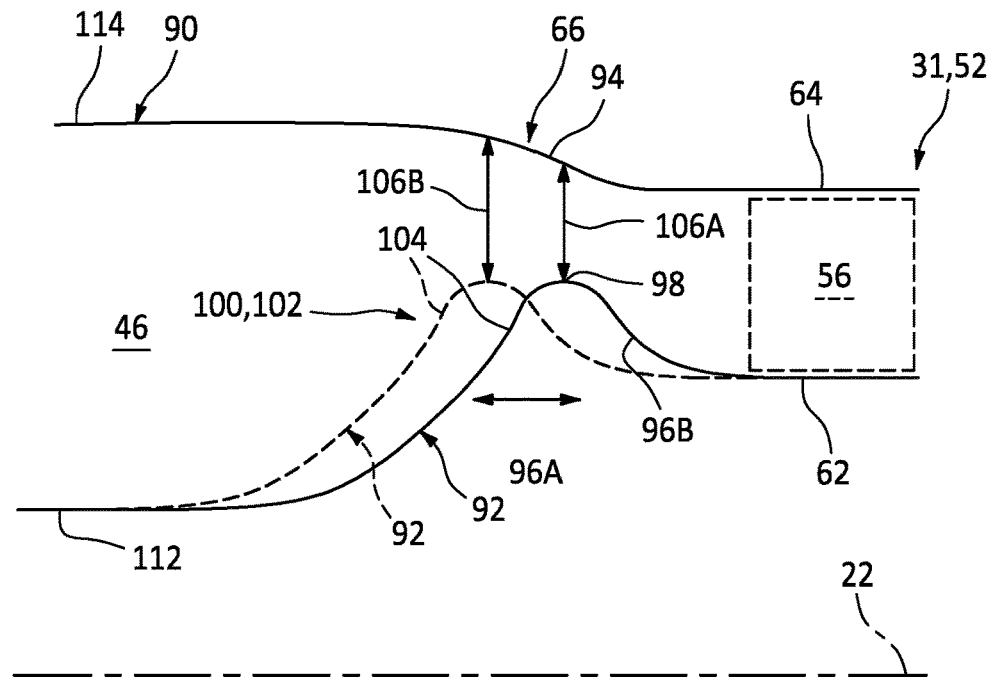
FIG. 12 is a sectional schematic illustration of a portion of the turbine engine with a variable area diffuser.

Referring to FIG. 12, the flow regulator 100 may be configured as a variable area diffuser 102. The inlet inner wall 92 of FIG. 12, for example, includes a movable sleeve 104; e.g., a translating sleeve. This movable sleeve 104 is configured to move (e.g., translate) axially along the axial centerline 22 between a closed (e.g., aft, downstream) position (see solid line sleeve 104) and an open (e.g., forward, upstream) position (see dashed line sleeve 104). This movable sleeve 104 is configured to form/carry the inner wall peak 98 and at least adjacent portions (or the entirety of) the upstream and downstream portions 96A and 98B of the inlet inner wall 92. With this configuration, the movable sleeve 104 is operable to move the inner wall peak 98 axially between an aft, downstream position when closed and to a forward, upstream position when open. At the aft, downstream (e.g., closed) position, the inner wall peak 98 is disposed a radial first distance 106A (e.g., measured along a line perpendicular to the axial centerline 22) from the inlet outer wall 94. At the forward, upstream (e.g., open) position, the inner wall peak 98 is disposed a radial second distance 106B (e.g., measured along a line perpendicular to the axial centerline 22) from the inlet outer wall 94. The second distance 106B is greater than the first distance 106A. Thus, the cross-sectional area of the STS inlet 66 is greater when the movable sleeve 104 is in its open position than when the movable sleeve 104 is in its closed position. Of course, although the movable sleeve 104 is configured as part of the inlet inner wall 92 in FIG. 12, the inlet outer wall 94 may also or alternatively be configured with a movable sleeve 104 for regulating flow through the STS inlet 66; e.g., see also FIG. 18A.

Figure 13:
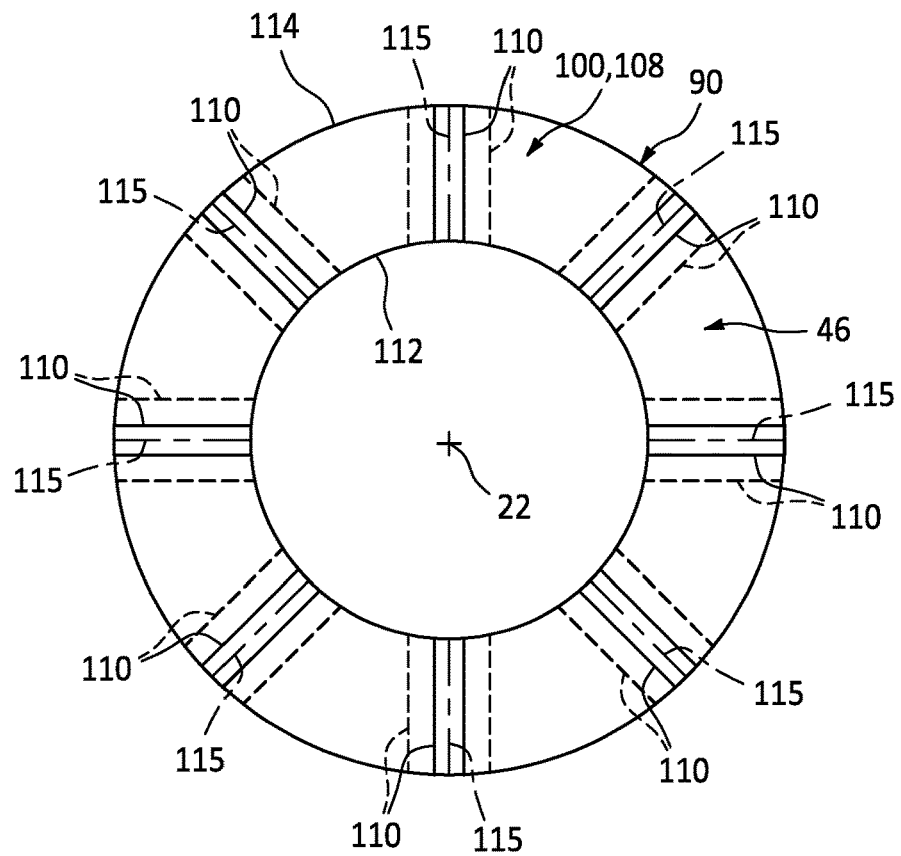
FIG. 13 is a cross-sectional schematic illustration of a portion of the turbine engine with a variable area vane array.

Referring to FIG. 13, the flow regulator 100 may be configured as a variable area vane array 108. This vane array 108 may be configured at, upstream of or downstream of the STS inlet 66 (see FIGS. 10 and 11). The vane array 108 of FIG. 13 includes a plurality of variable stator vanes 110 arranged circumferentially about the axial centerline 22 in an annular array. Each of these variable stator vanes 110 extends radially across the core flowpath 46 between an inner duct wall 112 (e.g., the inlet inner wall 92 or an adjacent wall) and an outer duct wall 114 (e.g., the inlet outer wall 94 or an adjacent wall). Each of the variable stator vanes 110 is configured to pivot about a (e.g., radially extending) pivot axis 115 between an open position (see solid line vane) and a closed position (see dashed line vane). When the variable stator vanes 110 are in their open positions, a cross-sectional flow area between each adjacent set of vanes 110 is greater than the cross-sectional flow area when the variable stator vanes 110 are in their closed positions. The variable stator vanes 110 may also or alternatively be configured to impart or remove swirl from the incoming exhaust gas.

Figure 14A:
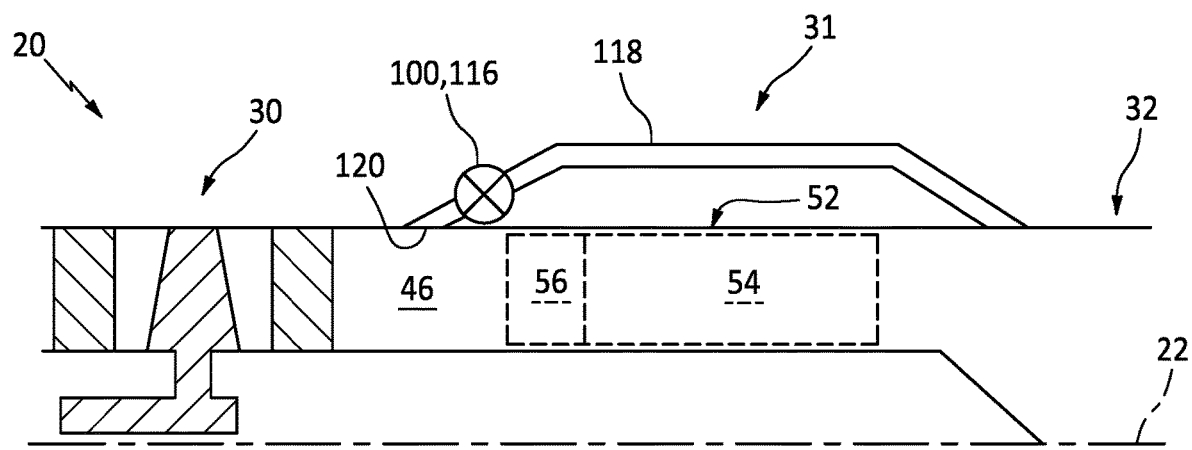
FIGS. 14A and 14B are sectional illustrations of portions of the turbine engine with various different supplemental thrust section bypasses.
Figure 14B:
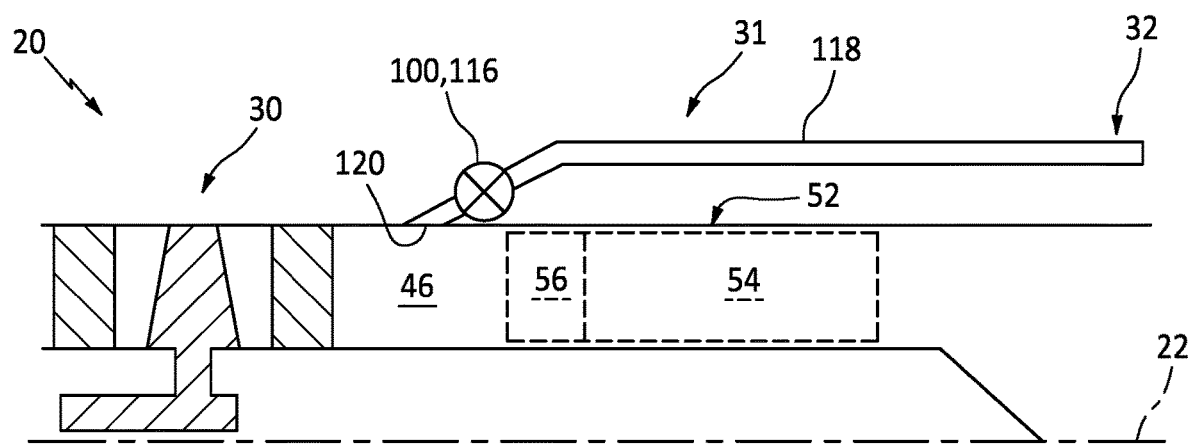

Referring to FIGS. 14A and 14B, the flow regulator 100 may be configured as a valve 116. The valve 116 of FIGS. 14A and 14B is configured to open and close or otherwise regulate flow through a supplemental thrust section bypass passage 118 configured to bypass at least a portion of entirety of the supplemental thrust section 31. The valve 116, for example, may be arranged at (e.g., on, adjacent or proximate) a bleed orifice 120 of the supplemental thrust section bypass passage 118 to the core flowpath 46. When the valve 116 is closed, the exhaust gas may flow unimpeded through the duct 90 to the rotating detonation combustor 52 and its combustion chamber 56. However, when the valve 116 is open, at least some of the exhaust gas may be bled (or otherwise diverted) from the core flowpath 46 into the supplemental thrust section bypass passage 118.

In some embodiments, referring to FIG. 14A, the supplemental thrust section bypass passage 118 may be configured to rejoin the core flowpath 46 downstream of the supplemental thrust section 31. In other embodiments, referring to FIG. 14B, the supplemental thrust section bypass passage 118 may be configured to remain separate from the core flowpath 46. The supplemental thrust section bypass passage 118 and the core flowpath 46, for example, may discretely direct the exhaust gas out of the turbine engine 20.

While the turbine engine 20 of the present disclosure is configured with the rotating detonation combustor 52 and, more generally, the supplemental thrust section 31 to facilitate high thrust operation as described above, the turbine engine 20 may spend more time during its life cycle at low thrust operation. To improve low thrust operation efficiency, the valve 116 of FIGS. 14A and 14B may be configured to partially or completely open during low thrust operation. The exhaust gas may thereby flow through both the supplemental thrust section 31 and the supplemental thrust section bypass passage 118 to reduce flow restriction to the exhaust gas before reaching, for example, the exhaust nozzle 38; see FIG. 1. The valve 116 may also be partially opened during low power supplemental thrust section operation. Of course, during other modes of operation, the valve 116 may completely close off the supplemental thrust section bypass passage 118 during supplemental thrust section operation.

Referring to FIG. 15, the turbine engine 20 may also or alternatively be configured with a hot-section bypass passage 122. This hot-section bypass passage 122 is configured to bleed core gas from upstream of at least the combustor section 29, and direct that bled core air for use in the combustion chamber 56. The hot-section bypass passage 122 of FIG. 15, for example, extends between and to a bypass passage inlet 124 and a bypass passage outlet 126. The bypass passage inlet 124 of FIG. 15 is located at (e.g., on, adjacent or proximate) the compressor section 28, and is configured to bleed the core air from the core flowpath 46 within (or upstream of, or downstream of) the compressor section 28. The bypass passage outlet 126 of FIG. 15 is located at (e.g., on, adjacent or proximate) the rotating detonation combustor 52 and its combustion chamber 56, and is configured to direct the bled core air to the rotating detonation combustor 52. With this configuration, the hot-section bypass passage 122 may direct a portion of the core air to bypass the combustor section 29 and the turbine section 30 in order to provide the supplemental thrust section 31 with a supply of relatively cool, low speed and oxygen rich gas during supplemental thrust section operation. This additional air may facilitate improved and/or more stable rotating detonation combustor operation.

The flow of bled core air through the hot-section bypass passage 122 may be regulated by a valve 128. The valve 128 may be completely opened during one or more modes of supplemental thrust section operation. The valve 128 may be partially opened during one or more other modes of supplemental thrust section operation. The valve 128 may be closed while the supplemental thrust section 31 is non-operational, or during low power supplemental thrust section operation.

In some embodiments, referring to FIG. 16A, the exhaust nozzle 38 may be configured as a fixed exhaust nozzle 130. In other embodiments, referring to FIG. 16B, the exhaust nozzle 38 may be configured as a variable exhaust nozzle 132. The variable exhaust nozzle 132 is configured to change a cross-sectional flow area of the exhaust nozzle to provide enhanced flow and/or pressure control during, inter alia, supplemental thrust section operation.

Figure 17A:
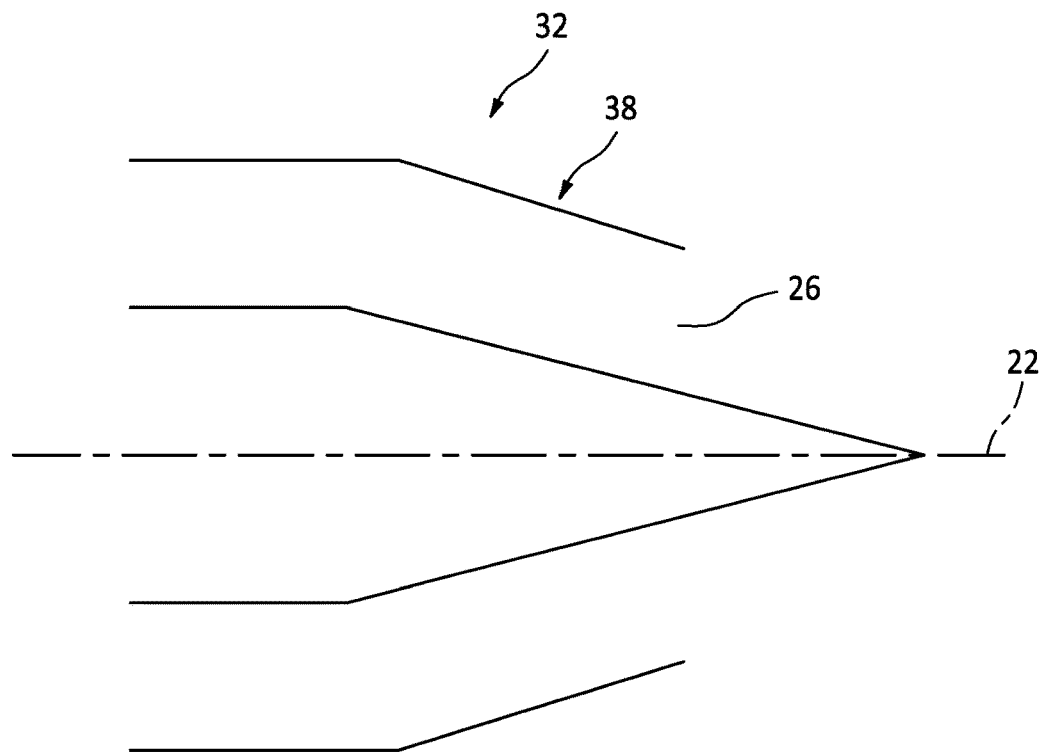
FIGS. 17A and 17B are sectional illustrations of portions of the turbine engine with various different exhaust nozzles.
Figure 17B:
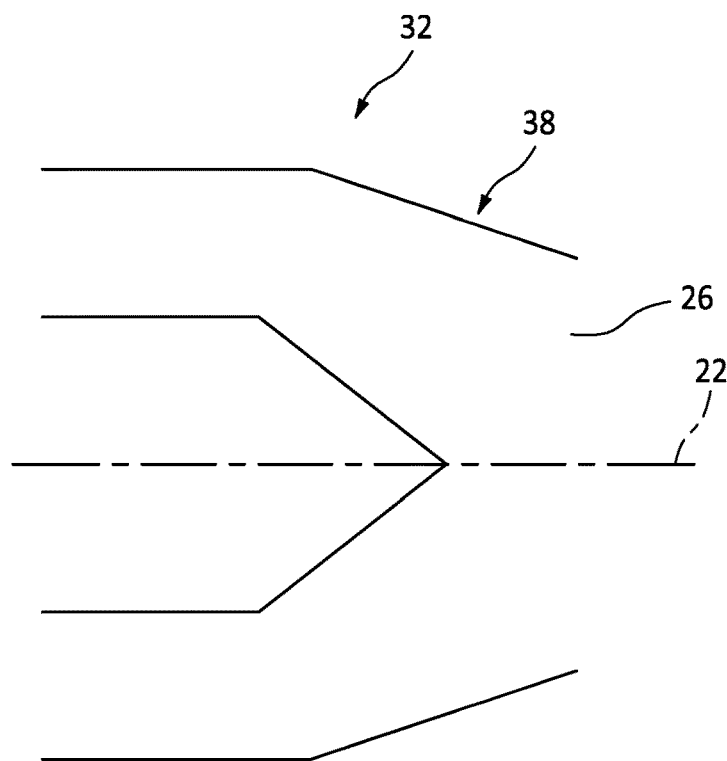

In some embodiments, referring to FIG. 17A, the exhaust nozzle 38 and its outlet 26 may have an annular cross-sectional configuration. In other embodiments, referring to FIG. 17B, the exhaust nozzle 38 and its outlet 26 may have a solid (e.g., non-annular, cylindrical, etc.) cross-sectional configuration.

In some embodiments, the bypass supplemental thrust section bypass passage 118 (e.g., see FIGS. 13A and 13B) may be configured as a single tubular conduit, or include a set of tubular conduits.

In some embodiments, referring to FIGS. 18A-18D, the bypass supplemental thrust section bypass passage 118 may include one or more annular ducts 134A and 134B (generally referred to as "134"). The bypass supplemental thrust section bypass passage 118 of FIGS. 18-A-18D, for example, includes the annular inner duct 134A and the annular outer duct 134B. The inner duct 134A is arranged inward of the rotating detonation combustor 52, and extends axially along the inner walls 62 and 68. The rotating detonation combustor 52 thereby circumscribes the inner duct 134A. The outer duct 134B circumscribes the rotating detonation combustor 52, and extends axially along the outer walls 64 and 70. The rotating detonation combustor 52 is thereby arranged radially inward of the outer duct 134B. The ducts 134 are configured for routing bypass flow around the rotating detonation combustor 52 or the entire supplemental thrust section. One or more of the ducts 134 may also or alternatively be configured for cooling a respective sidewall (e.g., 62 and/or 68; 64 and/or 70) of the rotating detonation combustor 52.

Referring to FIG. 18A, the inner duct 134A has a radial flowpath dimension 136A. The outer duct 134B has a radial flowpath dimension 136B. The rotating detonation combustor 52 has a radial flowpath dimension 138, which may be equal to or different (e.g., greater or less) than the radial flowpath dimension 136A and/or 136B.

Referring to FIG. 18A-18C, bypass flow through one or each of the ducts 134 may be regulated by a respective flow regulator 100. In some embodiments, referring to FIG. 18A, each flow regulator 100 may be configured as a moveable sleeve 140A, 140B. In some embodiments, referring to FIG. 18B, each flow regulator 100 may be include a plurality of variable stator vanes 142A, 142B, or a rotating blocker door. In some embodiments, referring to FIG. 18C, at least one of the ducts (e.g., 134B) may be configured without a flow regulator.

Referring to FIGS. 18B and 18D, flow into the rotating detonation combustor 52 may also or alternatively be regulated by a respective flow regulator 100. In some embodiments, referring to FIG. 18B, the flow regulator 100 may be include a plurality of variable stator vanes 144, or a rotating blocker door. In some embodiments, referring to FIG. 18D, the flow regulator 100 may be configured as a translating plug 146.

In some embodiments, the flow regulator(s) 100 may fully close the respective duct(s) 134 when the rotating detonation combustor 52 is operational. In other embodiments, the flow regulator(s) 100 may partially close the respective duct(s) 134 when the rotating detonation combustor 52 is operational. This may facilitate, for example, low power rotating detonation combustor operation, cooling of the rotating detonation combustor sidewalls during rotating detonation combustor operation, providing a mixed flow exhaust stream aft of the rotating detonation combustor 52, etc. Furthermore, while the flow regulator(s) 100 may be fully open when the rotating detonation combustor 52 is non-operational, the flow regulator(s) may also be partially closed during certain modes of engine operation while the rotating detonation combustor 52 is non-operational.

Figure 19:
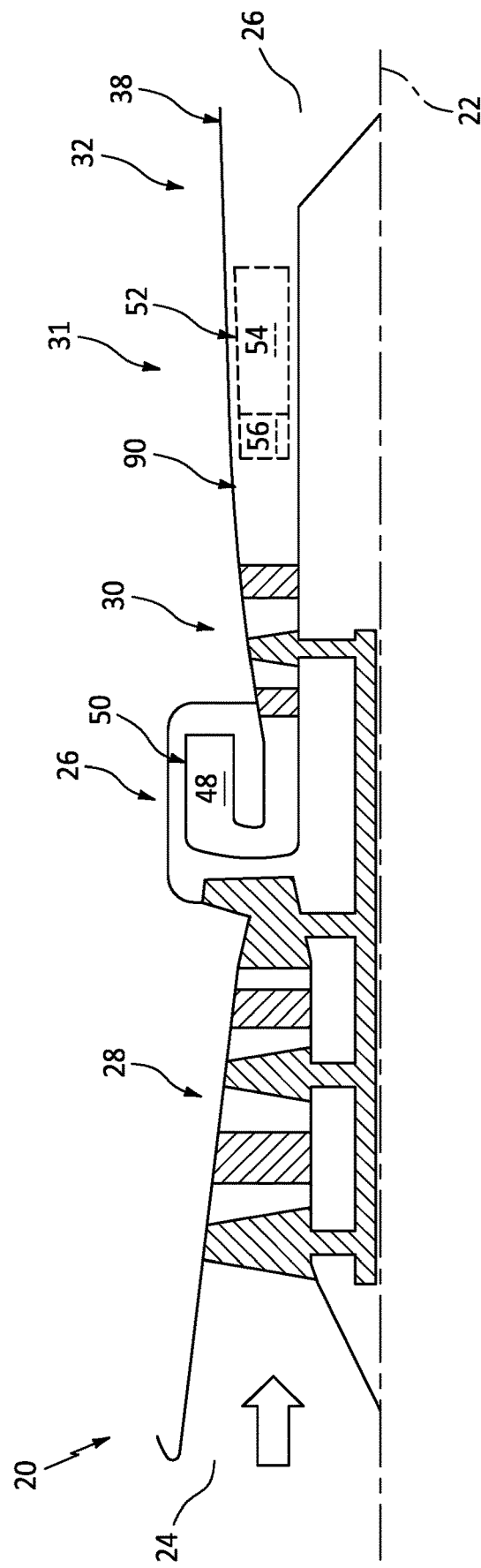
FIG. 19 is a sectional schematic illustration of the gas turbine engine with another combustor section.

In some embodiments, referring to FIG. 1, the combustor section 29 may be configured as an axial flow combustor section. In other embodiments, referring to FIG. 19, the combustor section 29 may be configured as a reverse flow combustor section.

The supplemental thrust section 31 and its rotating detonation combustor 52 may be included in various turbine engines other than the ones described above. The supplemental thrust section 31, for example, may be included in a geared turbine engine where a gear train connects one or more shafts to one or more rotors in a compressor section and/or any other engine section. Alternatively, the supplemental thrust section 31 may be included in a turbine engine configured without a gear train. The supplemental thrust section 31 may be included in a geared or non-geared turbine engine configured with a single spool (see FIGS. 1 and 19), with two spools, or with more than two spools. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a supplemental thrust section comprising a rotating detonation combustor;
   a turbine section upstream of the supplemental thrust section;
   a duct comprising a supplemental thrust section inlet fluidly coupled with and leading to the rotating detonation combustor, the supplemental thrust section inlet comprising a flow area that decreases as at least a first portion of the supplemental thrust section inlet extends towards the rotating detonation combustor, the supplemental thrust section inlet fluidly coupling the turbine section to the rotating detonation combustor, the duct comprising an inner duct wall and an outer duct wall, the inner duct wall forming an inner peripheral boundary of the first portion of the supplemental thrust section inlet and extending towards the rotating detonation combustor, and the outer duct wall forming an outer peripheral boundary of the first portion of the supplemental thrust section inlet and extending towards the rotating detonation combustor;

the turbine section fluidly coupled with and upstream of the duct; and the supplemental thrust section inlet comprising a flow regulator configured to regulate a flow of gas exhausted from the turbine section into the supplemental thrust section, the flow regulator comprising an inner translating sleeve and an outer translating sleeve, the inner translating sleeve adjacent and axially translatable along the inner duct wall, and the inner translating sleeve projecting radially outward from the inner duct wall into a flowpath to a radial outer peak of the inner translating sleeve, the outer translating sleeve adjacent and axially translatable along the outer duct wall, and the outer translating sleeve projecting radially inward from the outer duct wall into the flowpath to a radial inner peak of the outer translating sleeve, wherein the radial inner peak of the outer translating sleeve is axially aligned with the radial outer peak of the inner translating sleeve when the inner translating sleeve and the outer translating sleeve are each simultaneously translated to a downstream position.

2. The assembly of claim 1, wherein the supplemental thrust section inlet comprises an annular supplemental thrust section inlet.

3. The assembly of claim 1, wherein the flow area increases as a second portion of the supplemental thrust section inlet extends away from the first portion of the supplemental thrust section inlet and towards the rotating detonation combustor.

4. The assembly of claim 1, wherein the supplemental thrust section inlet forms a convergent-divergent diffuser inlet to the supplemental thrust section.

5. The assembly of claim 1, further comprising a variable area exhaust nozzle fluidly coupled with and configured downstream of the supplemental thrust section.

6. The assembly of claim 1, further comprising:

the turbine section fluidly coupled with and upstream of the duct;

a combustor section fluidly coupled with and upstream of the turbine section; and a bypass passage configured to provide gas to the supplemental thrust section that bypasses the combustor section and the turbine section.

7. The assembly of claim 6, further comprising:

a compressor section fluidly coupled with and upstream of the combustor section;

the bypass passage configured to receive the gas from the compressor section.

* * * * *